(No Model.)
L. DELORIA.
HARROW.
No. 316,755. Patented Apr. 28, 1885.
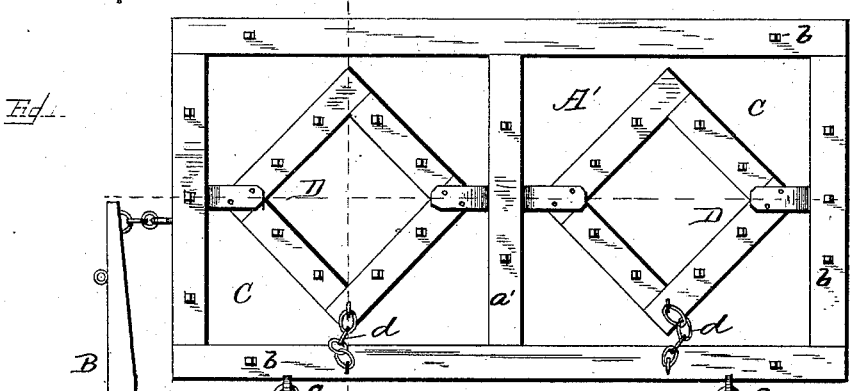
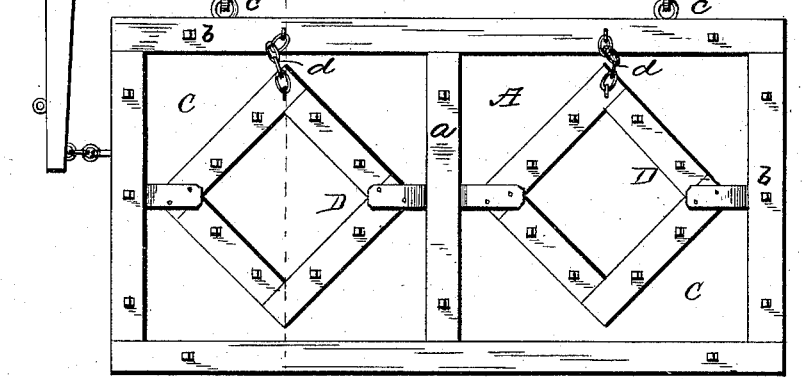
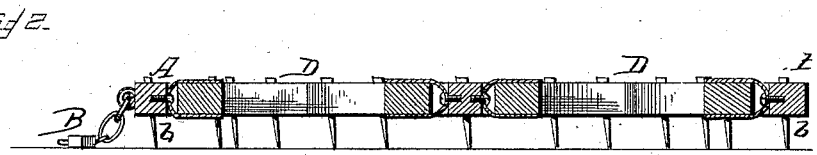
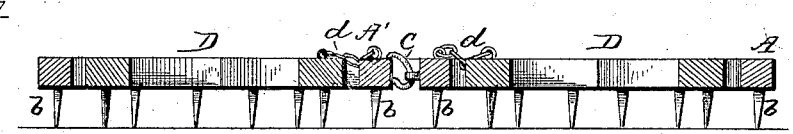
WITNESSES
F. L. Ourand
E. M. Johnson
Louis Deloria
INVENTOR
Attorney

UNITED STATES PATENT OFFICE.

LOUIS DELORIA, OF CHAUTAUQUA, KANSAS.

HARROW.

SPECIFICATION forming part of Letters Patent No. 316,755, dated April 28, 1885.

Application filed September 25, 1884. (No model.)

*To all whom it may concern:*

Be it known that I, LOUIS DELORIA, a citizen of the United States of America, residing at Chautauqua, in the county of Chautauqua and State of Kansas, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in harrows, the object being to provide an implement which will thoroughly pulverize the ground over which it passes, and to provide for inequalities in the ground, providing by my invention an implement which will accommodate itself to the irregularities of the surface of the ground.

In the accompanying drawings, which illustrate my invention, Figure 1 is a plan view of a harrow constructed in accordance with my invention. Figs. 2 and 3 are sectional views.

A A' represent two rectangular sections of the harrow-frame, which are provided centrally with cross-bars $a$ $a'$. These rectangular frames are provided with teeth $b$ $b$, which are slightly rearwardly inclined, and are located so that they will not follow in a direct line with each other. The sections A A' are coupled to each other near their ends by means of the connections $c$, one of the side bars of said sections being provided with a vertical loop or hook, while the opposite section has attached thereto horizontal eyes. The sections or frames hereinbefore referred to are also connected to each other at their front ends by a whiffletree or draft-bar, B.

The frames A A' have at their front and rear ends square spaces C, within which are pivoted square sections D, said sections being pivoted within the hollow squares at two opposite corners, as shown. To limit the movement of the pivoted sections D, they are secured to the inner side pieces of the frame A A' by means of link-connections $d$.

By means of the construction hereinbefore described I provide a harrow which will adapt itself to the inequalities of the surface of the ground, the larger inequalities being taken up or provided for by the side frames, A A', while the minor inequalities are compensated for by the smaller pivoted sections which are pivoted within the main frames.

I claim—

1. In a harrow, the combination of two side frames coupled to each other and provided with a draft attachment, said frames inclosing harrow-sections, each pivotally secured at two opposite corners to the side frame in which it is located, substantially as shown, and for the purpose set forth.

2. The combination, in a harrow, of the rectangular frames A A', having hollow squares formed therein, said frames being coupled to each other and provided with a draft attachment, and frames D, pivotally secured at two opposite corners within said hollow squares, as shown, and connected on one side to the side bars by connections $d$, substantially as shown, and for the purpose set forth.

In testimony whereof I affix my signature in presence of two witnesses.

LOUIS DELORIA.

Witnesses:
 B. F. BARRETT,
 JACOB E. BAKER.